(12) United States Patent
Fujii et al.

(10) Patent No.: US 11,079,800 B2
(45) Date of Patent: Aug. 3, 2021

(54) EXPANSION DEVICE FOR PORTABLE INFORMATION APPARATUSES

(71) Applicant: LENOVO (SINGAPORE) PTE. LTD., Singapore (SG)

(72) Inventors: Kazuo Fujii, Kanagawa (JP); Tabito Miyamoto, Kanagawa (JP); Masato Itoh, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 249 days.

(21) Appl. No.: 16/516,922

(22) Filed: Jul. 19, 2019

(65) Prior Publication Data
US 2020/0026329 A1 Jan. 23, 2020

(30) Foreign Application Priority Data
Jul. 19, 2018 (JP) .............................. JP2018-135795

(51) Int. Cl.
| | | |
|---|---|---|
| *G06F 1/16* | (2006.01) | |
| *H05K 5/00* | (2006.01) | |
| *H05K 7/00* | (2006.01) | |
| *H01R 13/62* | (2006.01) | |

(52) U.S. Cl.
CPC .......... *G06F 1/1632* (2013.01); *G06F 1/1633* (2013.01); *H01R 13/6205* (2013.01)

(58) Field of Classification Search
CPC .... G06F 1/1632; G06F 1/1633; G06F 1/1654; H01R 13/6205
See application file for complete search history.

(56) References Cited

U.S. PATENT DOCUMENTS

| | | | |
|---|---|---|---|
| 9,910,455 B1 * | 3/2018 | Morrison | G06F 1/1654 |
| 2012/0106078 A1 * | 5/2012 | Probst | G06F 1/1632 361/679.56 |
| 2012/0127651 A1 * | 5/2012 | Kwon | G06F 1/1632 361/679.43 |
| 2013/0148289 A1 * | 6/2013 | Kwon | G06F 1/1632 361/679.43 |

(Continued)

FOREIGN PATENT DOCUMENTS

| | | |
|---|---|---|
| JP | 07295939 A | 10/1995 |
| JP | 2005321995 A | 11/2005 |

(Continued)

*Primary Examiner* — Anthony M Haughton
(74) *Attorney, Agent, or Firm* — Antony P. Ng; Russell Ng PLLC

(57) ABSTRACT

An expansion device removably attachable even to a thin portable information apparatus and an electronic apparatus including the portable information apparatus and the expansion device are disclosed. An expansion device includes: a device chassis having a shorter front-rear dimension than a front-rear dimension of an apparatus chassis of a portable information apparatus; a plurality of attracted bodies such as a plurality of magnets or iron plates provided to face a top surface of the device chassis and capable of attracting a plurality of magnets provided to face a bottom surface of the apparatus chassis; and a fitting hole that is provided at the top surface of the device chassis and into which a leg portion protruding from the bottom surface of the apparatus chassis is fittable.

14 Claims, 16 Drawing Sheets

(56) References Cited

U.S. PATENT DOCUMENTS

| | | | |
|---|---|---|---|
| 2013/0277529 A1* | 10/2013 | Bolliger | F16M 13/00 |
| | | | 248/676 |
| 2016/0041582 A1* | 2/2016 | Kim | G06F 1/1626 |
| | | | 361/679.22 |
| 2016/0282905 A1* | 9/2016 | Laine | G06F 1/26 |
| 2017/0009934 A1* | 1/2017 | van Hooft | F16M 13/00 |
| 2017/0068289 A1* | 3/2017 | Buxton | G06F 1/163 |

FOREIGN PATENT DOCUMENTS

| | | |
|---|---|---|
| JP | 2014137645 A | 7/2014 |
| JP | 2014170380 A | 9/2014 |

\* cited by examiner

EXPANSION DEVICE FOR PORTABLE INFORMATION APPARATUSES

PRIORITY CLAIM

The present application claims benefit of priority under 35 U.S.C. §§ 120, 365 to the previously filed Japanese Patent Application No. JP2018-135795 with a priority date of Jul. 19, 2018, which is incorporated by reference herein.

TECHNICAL FIELD

The present invention relates to an expansion device removably attachable to a portable information apparatus in general, and in particular to an expansion device for portable information apparatuses.

BACKGROUND

With rapid thickness reduction of chassis of portable information apparatuses such as laptop personal computers (laptop PCs), the functions of portable information apparatuses are often limited. For such portable information apparatuses, expansion devices as dedicated devices for expanding functions are provided. Typically, a conventional expansion device would include, for example, a hook-like engagement member that can be engaged with and removed from an engagement hole formed at the bottom surface of a portable information apparatus.

For a conventional expansion device, the engagement hole that the engagement member can be inserted into and engaged with needs to be formed at the bottom surface of the portable information apparatus. In the case where the portable information apparatus has a very thin chassis, it may be difficult to secure a space for forming such an engagement hole.

Consequently, it would be desirable to provide an improved expansion device that is capable of removably attachable to thin portable information apparatuses.

SUMMARY

In accordance with an embodiment of the present disclosure, an expansion device includes a device chassis having a shorter front-rear dimension than a front-rear dimension of an apparatus chassis of a portable information apparatus; a set of magnets provided to face a top surface of the device chassis and is capable of attracting a set of attracted bodies provided to face a bottom surface of the apparatus chassis; and a fitting hole that is provided at the top surface of the device chassis and into which a leg portion protruding from the bottom surface of the apparatus chassis is fittable.

With the above-mentioned configuration, the expansion device not only prevents the leg portion protruding from the bottom surface of the portable information apparatus from interfering with the top surface, but also enables effective use of the leg portion for positioning by fitting the leg portion into the fitting hole. Moreover, it suffices to provide, in the apparatus chassis of the portable information apparatus, at least the attracted bodies such as magnets or iron plates that attract the magnets facing the top surface of the expansion device. This is easy even in the case where the apparatus chassis is thin. In other words, the portable information apparatus does not need, at the bottom surface of the apparatus chassis, an engagement hole for inserting a hook-like engagement member protruding from the expansion device. Hence, the apparatus chassis of the portable information apparatus can be reduced in thickness as much as possible. The expansion device can be reliably attached to and removed from such a thin portable information apparatus.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
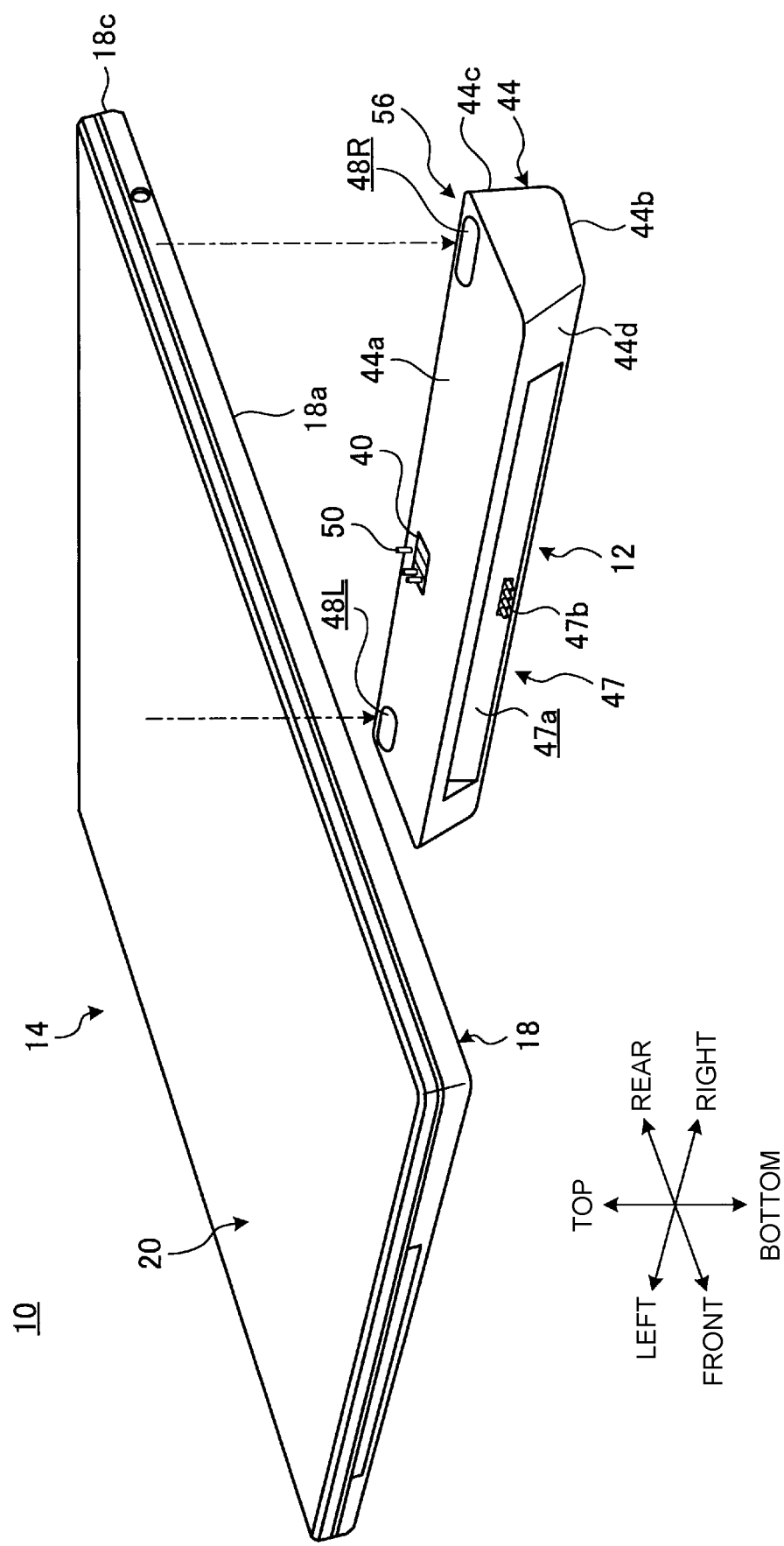
FIG. 1 is an exploded perspective view illustrating operation of attaching an expansion device to a portable information apparatus in an electronic apparatus according to one embodiment.
Figure 2A:
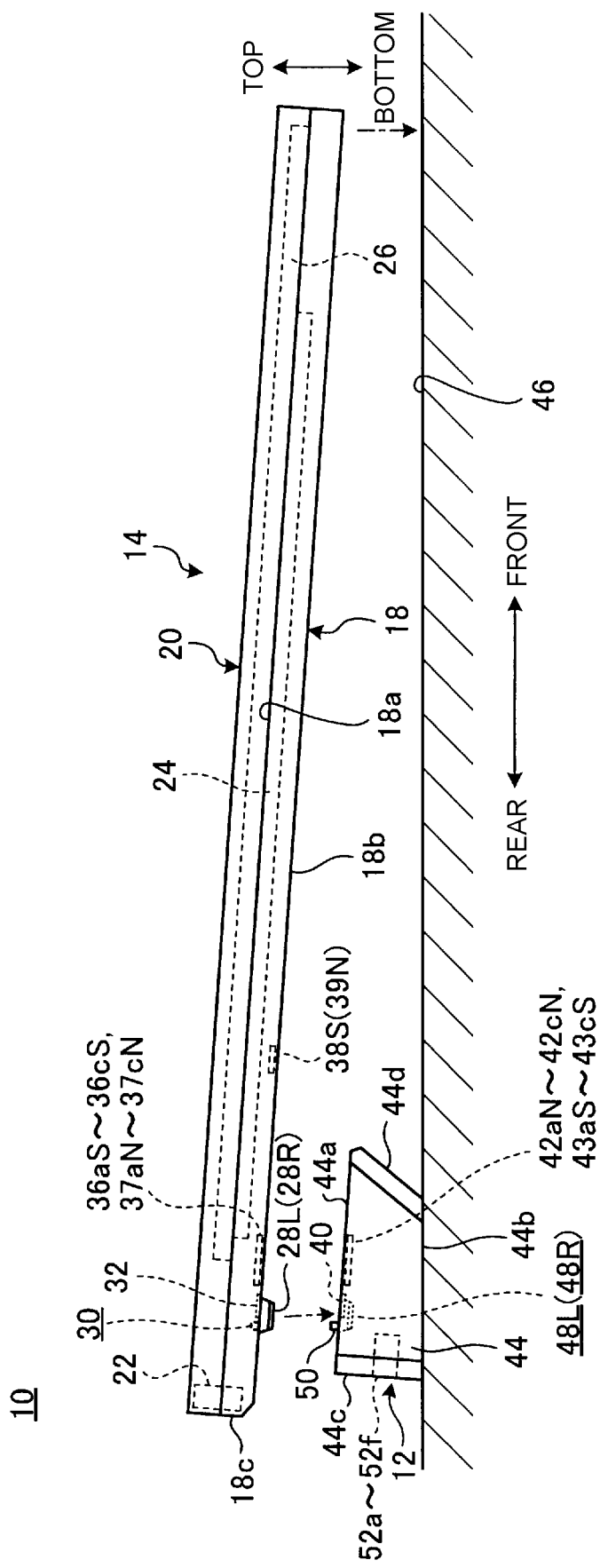
FIG. 2A is a side view illustrating the operation of attaching the expansion device to the portable information apparatus.
Figure 2B:
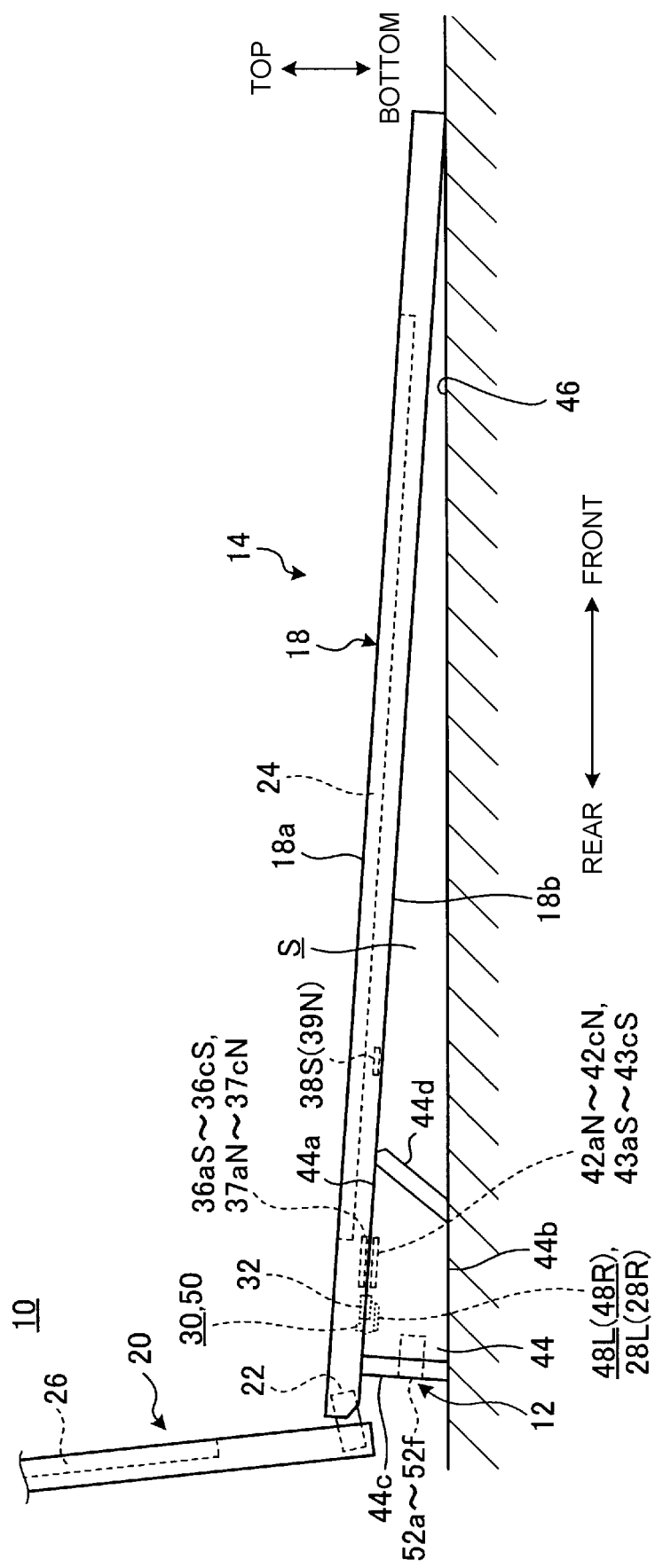
FIG. 2B is a side view of the electronic apparatus in which the expansion device is attached to the portable information apparatus.

FIG. 1 is an exploded perspective view illustrating operation of attaching an expansion device 12 to a portable information apparatus 14 in an electronic apparatus 10 according to an embodiment of the present invention. FIG. 2A is a side view illustrating the operation of attaching the expansion device 12 to the portable information apparatus 14. FIG. 2B is a side view of the electronic apparatus 10 in which the expansion device 12 is attached to the portable information apparatus 14.

The electronic apparatus 10 according to this embodiment has the expansion device 12 removably attached to the portable information apparatus 14 such as a laptop PC. The expansion device 12 expands the functions of the portable information apparatus 14 by, for example, increasing the number of external apparatuses connectable to the portable information apparatus 14 or increasing the storage capacity.

Hereafter, based on the direction in which the user uses the portable information apparatus 14 as a laptop PC to which the expansion device 12 is attached, the front side is referred to as "front," the rear side as "rear," the thickness direction of the expansion device 12 as "top-bottom," and the width direction of the expansion device 12 as "left-right," as illustrated in FIG. 2B.

As illustrated in FIGS. 1 to 2B, the portable information apparatus 14 has a structure in which an apparatus chassis 18 and a display chassis 20 are rotatably coupled by a hinge 22. The apparatus chassis 18 is a chassis formed in a thin rectangular box shape. A keyboard device 24 is located at a top surface 18a of the apparatus chassis 18, and the expansion device 12 is attached to and removed from a bottom surface 18b of the apparatus chassis 18. The keyboard device 24 may be a software keyboard device displayed on a touch panel display provided at the top surface 18a of the apparatus chassis 18. The display chassis 20 is a chassis formed in a thin rectangular box shape, and has a display 26 in a main part of its front surface. The hinge 22 couples the bottom end of the display chassis 20 to the rear end of the apparatus chassis 18. The hinge 22 in this embodiment has a structure of projecting rearward from the rear surface 18c of the apparatus chassis 18 when the display chassis 20 is opened (see the hinge 22 indicated by chain double-dashed lines in FIG. 2B), i.e. a drop-down structure. The hinge 22 may have a structure other than a drop-down structure. The portable information apparatus 14 is not limited to a clamshell laptop PC, and may have, for example, a structure in which the display chassis 20 is a tablet PC, the apparatus chassis 18 is the keyboard device 24, and the display chassis 20 and the apparatus chassis 18 are removably attachable to each other.

Figure 3:
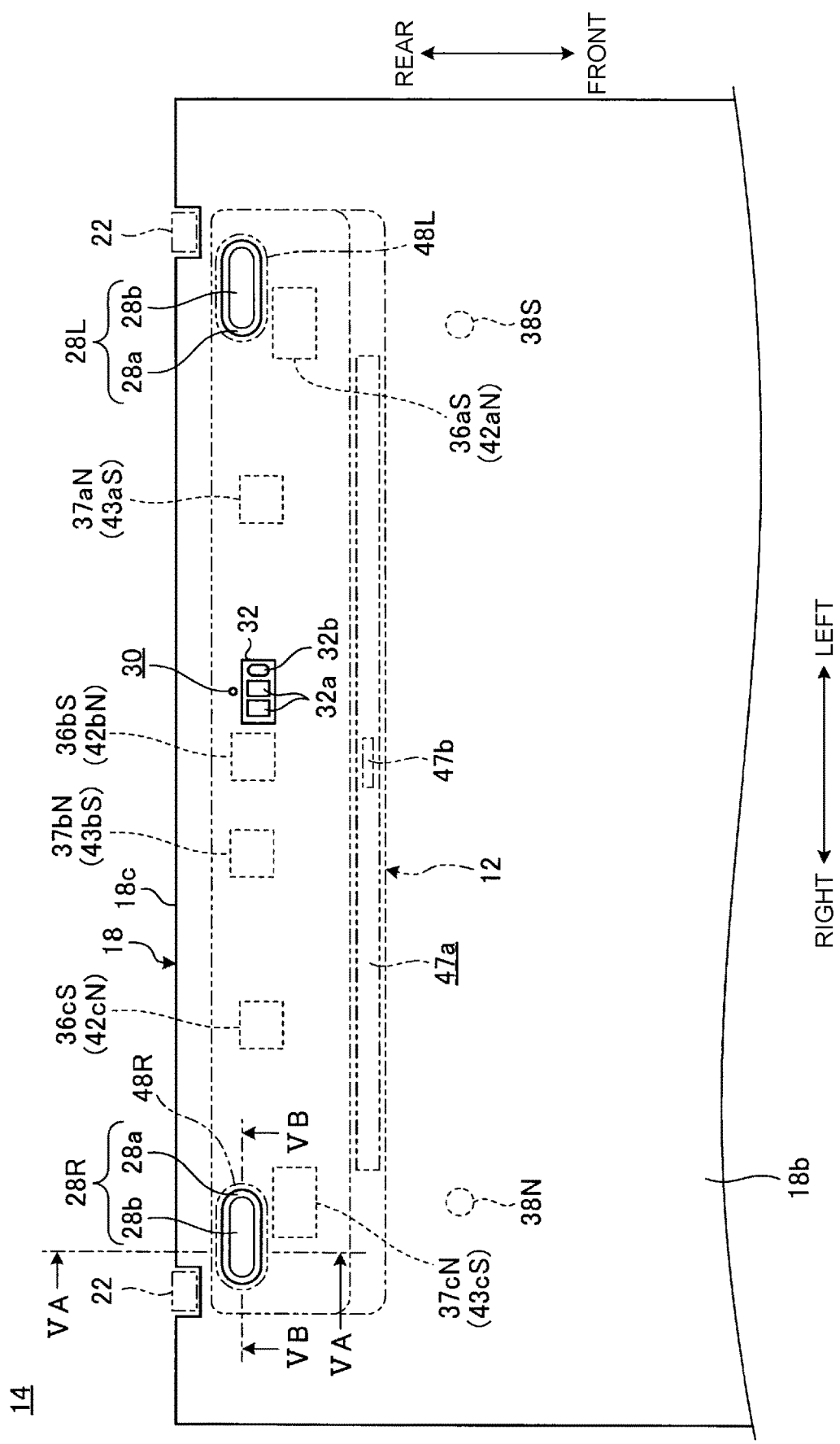
FIG. 3 is an enlarged bottom view illustrating an example of the structure of a bottom surface of an apparatus chassis of the portable information apparatus.

FIG. 3 is an enlarged bottom view illustrating an example of the structure of the bottom surface 18b of the apparatus chassis 18 of the portable information apparatus 14.

As illustrated in FIGS. 2A to 3, a pair of left and right leg portions 28L and 28R, a positioning hole 30, and a connected portion 32 are provided at the bottom surface 18b of the apparatus chassis 18. Further, the apparatus chassis 18 is provided with a plurality of magnets 36aS, 36bS, 36cS, 37aN, 37bN, and 37cN and a pair of left and right magnets 38S and 39N so as to face the bottom surface 18b.

The leg portions 28L and 28R are provided respectively at the left and right of the rear part of the bottom surface 18b, and protrude downward from the bottom surface 18b. The leg portions 28L and 28R are each in an oblong domical shape with its longitudinal direction corresponding to the left-right direction. That is, the leg portions 28L and 28R each have a tapered shape that decreases in diameter so that the cross-sectional area in the horizontal direction gradually decreases from the bottom surface 18b to the top surface (projection direction) (also see FIGS. 5A and 5B). The leg portions 28L and 28R are not limited to an oblong domical shape, and may have any of various shapes such as a circular domical shape, a rectangular domical shape, and a rectangular parallelepiped shape. In this embodiment, the leg portions 28L and 28R are each composed of a pedestal-like base 28a fixed to the bottom surface 18b and a rubber-made contact portion 28b fixed to the surface of the base 28a. That is, the leg portions 28L and 28R are rubber legs. The leg portions 28L and 28R are each only required to have at least its surface made of a soft material such as rubber or resin. The leg portions 28L and 28R may be each wholly made of a soft material such as rubber, including the base 28a.

The positioning hole 30 is a small-diameter hole formed at the left-right substantial center on the rear end side of the bottom surface 18b. The positioning hole 30 is formed in a resin or metal plate which is a chassis member forming the bottom surface 18b of the apparatus chassis 18. The positioning hole 30 is located near the rear side of the connected portion 32.

The connected portion 32 is located on the front side of the positioning hole 30, at the left-right substantial center on the rear end side of the bottom surface 18b. The connected portion 32 is buried in the apparatus chassis 18, and has its surface exposed to the bottom surface 18b. The connected portion 32 is a communication portion electrically connected to the below-described connection portion 40 of the expansion device 12 (see FIG. 4A). The connected portion 32 has an optical communication module 32a which is non-contact type electric connection means, and a terminal board 32b which is contact type electric connection means. For example, the connected portion 32 may be composed of only one of the optical communication module 32a and the terminal board 32b. The connected portion 32 may be omitted.

The magnets 36aS to 36cS, 37aN to 37cN, 38S, and 39N are each a magnet that is located at the bottom inside the apparatus chassis 18 so as to face the bottom surface 18b, and thus can generate a magnetic force through the bottom surface 18b of the apparatus chassis 18. The magnets 36aS to 36cS and 37aN to 37cN are provided along the left-right direction, at a position overlapping the attachment position of the expansion device 12 to the bottom surface 18b (see the expansion device 12 indicated by chain double-dashed lines in FIG. 3). When the expansion device 12 is positioned to the bottom surface 18b, the magnets 36aS to 36cS and 37aN to 37cN can attract respectively the below-described plurality of magnets 42aN, 42bN, 42cN, 43aS, 43bS, and 43cS of the expansion device 12 (see FIG. 4A). The magnets 38S and 39N are located respectively on the front side of the magnets 36aS and 37cN at the left and right ends.

As illustrated in FIGS. 1 to 2B, the expansion device 12 includes the device chassis 44. The device chassis 44 is a chassis formed in a prismatic shape extending in the left-right direction. The top surface 44a of the device chassis 44 is an attachment surface to the bottom surface 18b of the apparatus chassis 18 of the portable information apparatus 14, and the bottom surface 44b of the device chassis 44 is a land surface to a use surface 46 such as the top plate of a desk.

Figure 7:
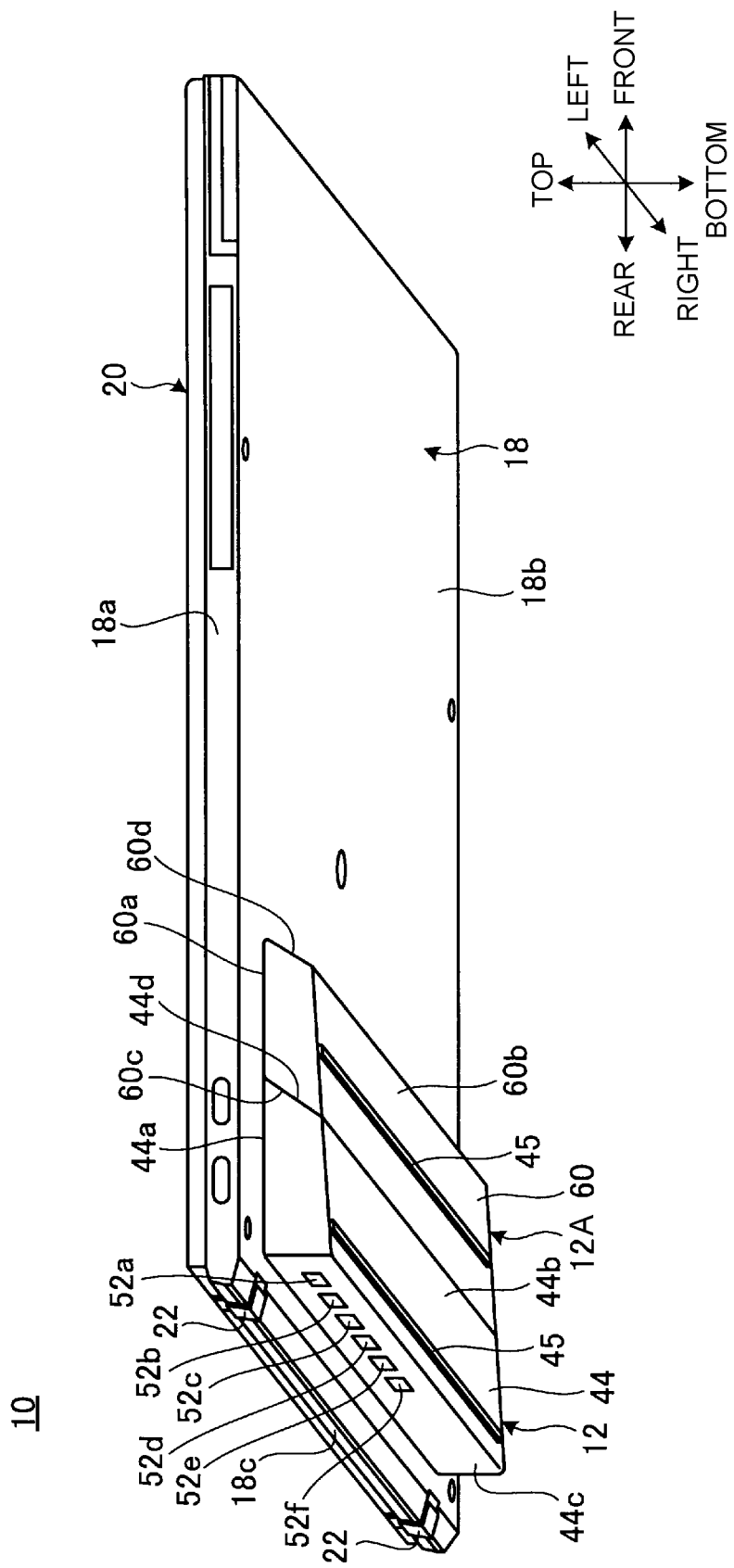
FIG. 7 is a perspective view of the electronic apparatus in which another expansion device is added to the front surface of the expansion device, as seen from diagonally below behind.

The device chassis 44 has a front-part-low inclined shape in which the thickness between the top surface 44a and the bottom surface 44b gradually decreases in the direction from the rear surface 44c to the front surface 44d, i.e. the direction from the rear to the front (see FIGS. 2A and 2B). In this embodiment, the bottom surface 44b is a horizontal surface orthogonal to the rear surface 44c, and the top surface 44a is a front-part-low inclined surface. The device chassis 44 has a shorter front-rear dimension than the front-rear dimension of the apparatus chassis 18, and is attached to the rear end side of the bottom surface 18b of the apparatus chassis 18. Thus, the electronic apparatus 10 is provided in a front-part-low inclined posture on the use surface 46, with the bottom surface 44b of the expansion device 12 being a land surface on the rear end side to the use surface 46 and the front end of the bottom surface 18b of the apparatus chassis 18 of the portable information apparatus 14 being a land surface on the front end side to the use surface 46 (see FIG. 2B). This enables the keyboard device 24 mounted on the top surface 18a of the apparatus chassis 18 to be in an appropriate front-part-low inclined posture. Hence, the operability is improved, and a space S of a certain size is formed in front of the expansion device 12. Rubber plates 45 (see FIG. 7) may be provided at the bottom surface 44b of the device chassis 44. As illustrated in FIG. 7, the rubber plates 45 are strip-shaped rubber legs extending in the left-right direction. The rubber plates 45 may have the same structure as the leg portions 28L and 28R of the portable information apparatus 14.

The front surface 44d of the device chassis 44 is an inclined surface that is inclined gradually rearward in the direction from the top to the bottom. That is, the device chassis 44 is shaped so that the front-rear length of the bottom surface 44b is shorter than the front-rear length of the top surface 44a. The front surface 44d may be a vertical surface along the top-bottom direction. A positioning coupling portion 47 including a positioning recessed portion 47a, a coupling terminal (terminal) 47b, and a magnet 47c (see FIG. 4B) and used when removably attaching the below-described expansion device 12A for expansion (see FIG. 7) is provided at the front surface 44d. The positioning coupling portion 47 may be omitted in the case of not employing specifications of enabling addition of another expansion device 12A (see FIG. 7) to the expansion device 12.

Figure 4A:
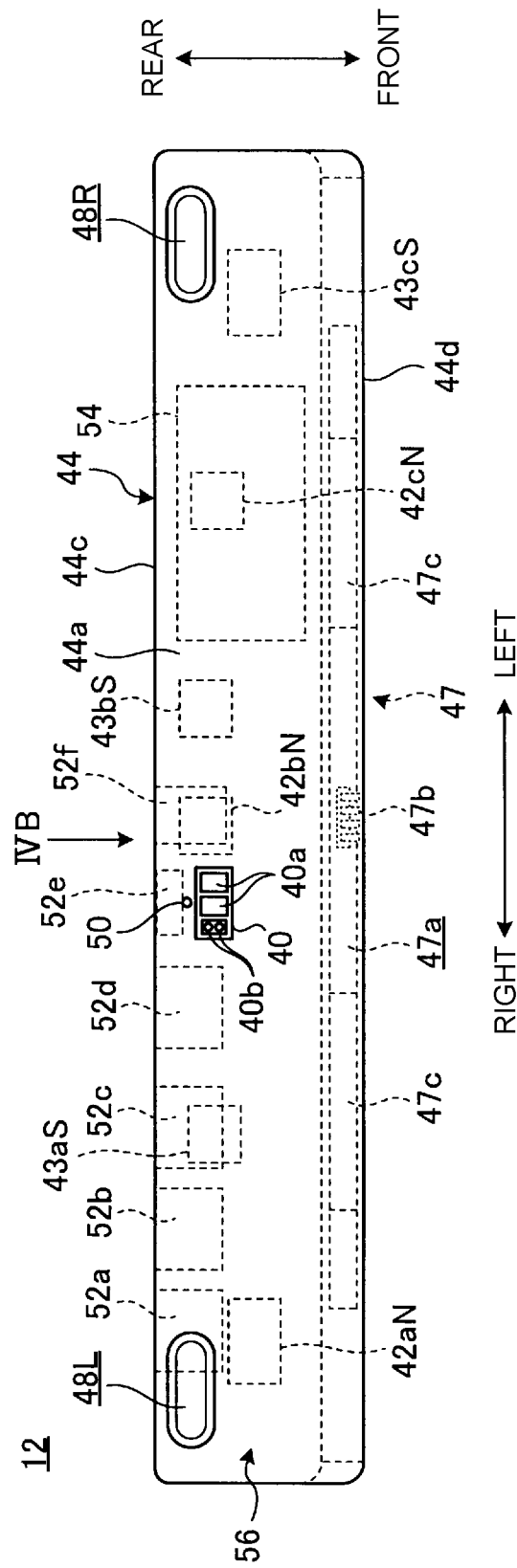
FIG. 4A is a plan view of the expansion device.
Figure 4B:
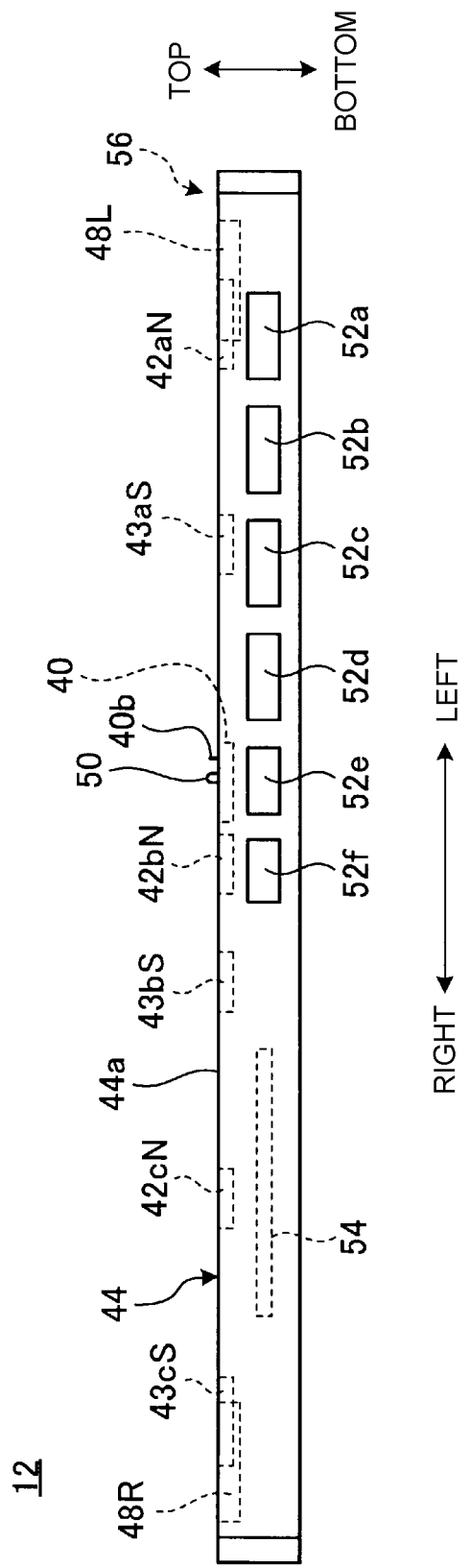
FIG. 4B is a back view of the expansion device.

FIG. 4A is a plan view of the expansion device 12. FIG. 4B is a back view of the expansion device 12 as seen in the direction of arrow IVB in FIG. 4A.

As illustrated in FIGS. 4A and 4B, a pair of left and right fitting holes 48L and 48R, a positioning pin (positioning projection) 50, and a connection portion 40 are provided at the top surface 44a of the device chassis 44. Further, the device chassis 44 is provided with a plurality of magnets 42aN to 42cN and 43aS to 43cS so as to face the top surface 44a. A plurality of connection terminals 52a, 52b, 52c, 52d, 52e, and 52f are provided at the rear surface 44c of the device chassis 44. A storage device 54 is provided inside the device chassis 44.

The fitting holes 48L and 48R are recessed portions provided respectively at the left and right of the rear part of the top surface 44a. The fitting holes 48L and 48R are each in an oblong bathtub shape with its longitudinal direction corresponding to the left-right direction. That is, the fitting holes 48L and 48R each have a tapered shape that decreases in diameter so that the cross-sectional area in the horizontal direction gradually decreases from the top surface 44a to the bottom surface (recess direction) (also see FIGS. 5A and 5B). The fitting holes 48L and 48R are holes into which the leg portions 28L and 28R of the portable information apparatus 14 are fitted. Therefore, the fitting holes 48L and 48R are shaped according to the shape of the leg portions 28L and 28R so that the leg portions 28L and 28R can be fitted into the fitting holes 48L and 48R with a predetermined tolerance. As a result of the leg portions 28L and 28R being fitted into the fitting holes 48L and 48R, the expansion device 12 is positioned in the front-rear and left-right directions at a predetermined position with respect to the bottom surface 18b of the portable information apparatus 14, and also the expansion device 12 is prevented from rotating in the horizontal direction.

The positioning pin 50 is a small-diameter pin protruding upward from the left-right substantial center of the rear end side of the top surface 44a, and is made of, for example, metal. The positioning pin 50 can be fitted into the positioning hole 30 of the bottom surface 18b of the portable information apparatus 14. As a result of the positioning pin 50 being fitted into the positioning hole 30, the expansion device 12 is positioned in the front-rear and left-right directions at a predetermined position with respect to the bottom surface 18b of the portable information apparatus 14 more accurately. The positioning pin 50 may be omitted.

The connection portion 40 is located on the front side of the positioning pin 50, at the left-right substantial center on the rear end side of the top surface 44a. The connection portion 40 is buried in the device chassis 44, and has its surface exposed to the top surface 44a. The connection portion 40 is a communication portion electrically connected to the connected portion 32 provided at the bottom surface 18b of the portable information apparatus 14. The connection portion 40 has an optical communication module 40a which is non-contact type electric connection means, and a terminal pin 40b which is contact type electric connection means. The optical communication module 40a faces the optical communication module 32a of the portable information apparatus 14. For example, a pair of front and rear terminal pins 40b are provided as elastic advancing/retreating metal pins (spring pins) that come into contact with the terminal board 32b of the portable information apparatus 14. The two terminal pins 40b are, for example, a power pin and a ground pin. The connection portion 40 may be composed of only one of the optical communication module 40a and the terminal pin 40b, and may be omitted, as with the above-described connected portion 32.

The magnets 42aN to 42cN and 43aS to 43cS are each a magnet that is located at the top inside the device chassis 44 so as to face the top surface 44a, and thus can generate a magnetic force through the top surface 44a of the device chassis 44. Here, the magnets 42aN to 42cN have N-pole facing the top surface 44a, and the magnets 43aS to 43cS have S-pole facing the top surface 44a. Likewise, in the portable information apparatus 14, the magnets 36aS to 36cS have S-pole facing the bottom surface 18b, and the magnets 37aN to 37cN have N-pole facing the bottom surface 18b. The magnet 38S has S-pole facing the bottom surface 18b, and the magnet 39N has N-pole facing the bottom surface 18b.

The magnets 42aN to 42cN and 43aS to 43cS are located to respectively face the magnets 36aS to 36cS and 37aN to 37cN provided at the bottom surface 18b of the portable information apparatus 14. Specifically, the magnet 42aN faces the magnet 36aS, the magnet 42bN faces the magnet 36bS, and the magnet 42cN faces the magnet 36cS. The magnet 43aS faces the magnet 37aN, the magnet 43bS faces the magnet 37bN, and the magnet 43cS faces the magnet 37cN. This generates an attraction force between the magnets 42aN to 42cN and 43aS to 43cS and the magnets 36aS to 36cS and 37aN to 37cN, as a result of which the top surface 44a of the expansion device 12 is removably attached to the bottom surface 18b of the portable information apparatus 14. In this embodiment, the magnets 42aN to 42cN and 43aS to 43cS have N-pole and S-pole alternating in the arrangement direction. This causes a certain degree of positioning action between the magnets 42aN to 42cN and 43aS to 43cS and the magnets 36aS to 36cS and 37aN to 37cN.

Thus, the fitting holes 48L and 48R, the magnets 42aN to 42cN and 43aS to 43cS, and the positioning pin 50 constitute a positioning attachment portion 56 that positions the expansion device 12 with respect to the bottom surface 18b of the portable information apparatus 14 and removably attaches the expansion device 12 to the bottom surface 18b of the portable information apparatus 14.

The connection terminals 52a to 52c and 52f are, for example, terminals conforming to the Universal Serial Bus (USB) standard or any of other various standards. For example, the connection terminals 52a to 52c and 52f are capable of connecting an external apparatus (not illustrated) such as an optical disc device or an external storage device. The connection terminal 52d is, for example, a card slot into which any of various memory cards such as micro SD card can be removably inserted. The connection terminal 52e is, for example, a communication interface capable of connecting a connector of any of various communication standards such as HDMI. An external apparatus connected to the connection terminals 52a to 52f is electrically connected to the portable information apparatus 14 via the connection portion 40 and the connected portion 32, to be operable on the portable information apparatus 14 side. The connection standard, the number, etc. of the connection terminals 52a to 52f may be changed.

Figure 5A:
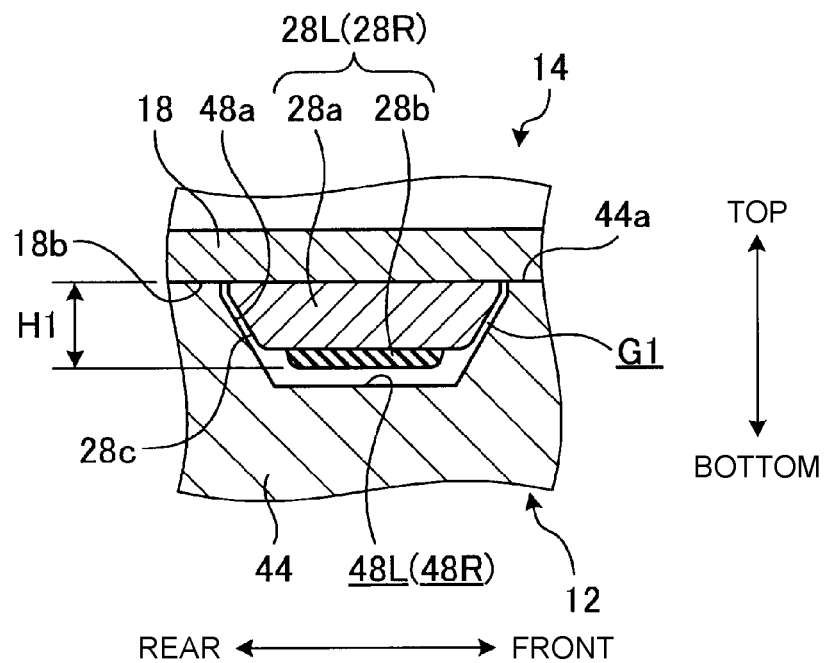
FIG. 5A is a sectional side view of a leg portion and a fitting hole in a fitting state taken along their lateral directions.
Figure 5B:
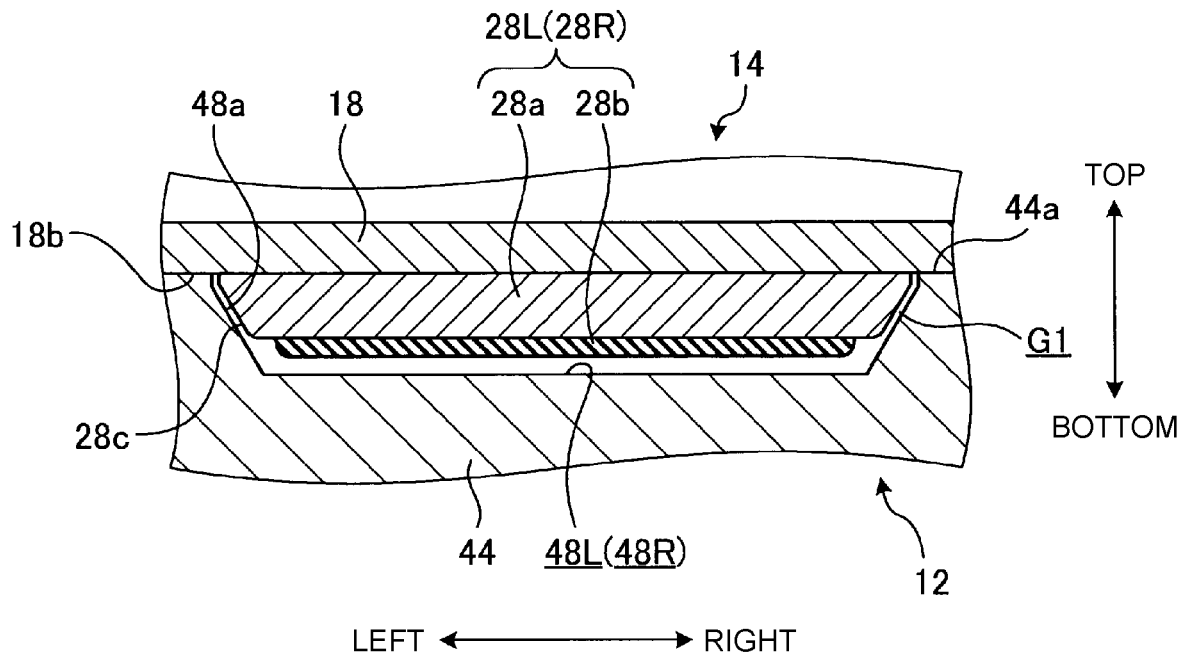
FIG. 5B is a sectional side view of the leg portion and the fitting hole in a fitting state taken along their longitudinal directions.
Figure 6:
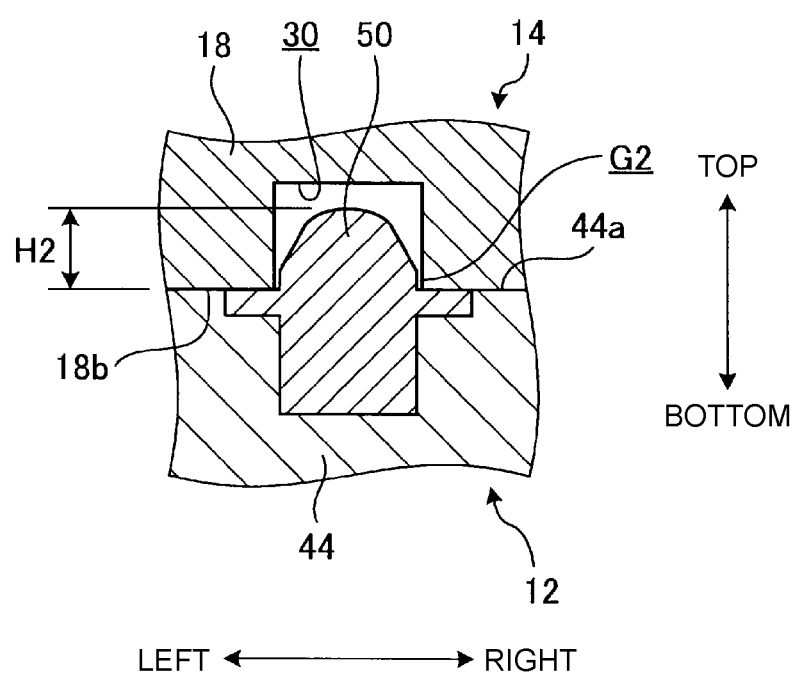
FIG. 6 is a sectional side view illustrating a fitting state of a positioning hole and a positioning pin.

The operation and structure of attaching the expansion device 12 to the portable information apparatus 14 and removing the expansion device 12 from the portable information apparatus 14 will be described below. FIG. 5A is a sectional side view of the leg portion 28L (28R) and the fitting hole 48L (48R) in a fitting state taken along their lateral directions (VA-VA line in FIG. 3). FIG. 5B is a sectional side view of the leg portion 28L (28R) and the fitting hole 48L (48R) in a fitting state taken along their longitudinal directions (VB-VB line in FIG. 3). FIG. 6 is a sectional side view illustrating a fitting state of the positioning hole 30 and the positioning pin 50.

When attaching the expansion device 12 to the portable information apparatus 14, the top surface 44a of the expansion device 12 is brought closer to the attachment position on the rear end side of the bottom surface 18b of the portable information apparatus 14, and the leg portions 28L and 28R are fitted into the fitting holes 48L and 48R. As illustrated in FIGS. 5A and 5B, the outer peripheral side surface of each of the leg portions 28L and 28R forms an outer peripheral tapered surface 28c that gradually decreases in diameter in the projection direction. Likewise, the inner peripheral side surface of each of the fitting holes 48L and 48R forms an inner peripheral tapered surface 48a that gradually decreases in diameter in the recess direction. Accordingly, the leg portions 28L and 28R are each led to the inner peripheral tapered surface 48a of a corresponding one of the fitting holes 48L and 48R through its outer peripheral tapered surface 28c, so that the leg portions 28L and 28R and the fitting holes 48L and 48R can be fitted together easily.

In the electronic apparatus 10, the projection height H1 of the leg portions 28L and 28R from the bottom surface 18b (see FIG. 5A) is higher than the projection height H2 of the positioning pin 50 from the top surface 44a (see FIG. 6). Accordingly, after at least part of each of the leg portions 28L and 28R is inserted into a corresponding one of the fitting holes 48L and 48R, the positioning pin 50 is fitted into the positioning hole 30 as illustrated in FIG. 6.

In this embodiment, the fitting tolerance between the leg portions 28L and 28R and the fitting holes 48L and 48R (e.g. 0.5 mm) is set to be larger than the fitting tolerance between the positioning pin 50 and the positioning hole 30 (e.g. 0.05 mm). That is, the gap G1 formed between the leg portions 28L and 28R and the fitting holes 48L and 48R is larger than the gap G2 formed between the positioning pin 50 and the positioning hole 30. Hence, after a certain degree of positioning is made by the leg portions 28L and 28R and the fitting holes 48L and 48R, the positioning pin 50 is fitted into the positioning hole 30. This enables smooth fitting of the positioning pin 50 and the positioning hole 30 having a strict fitting tolerance, and achieves more accurate positioning action after the fitting is completed.

Moreover, in the electronic apparatus 10, the projection height H1 of the leg portions 28L and 28R is higher than the projection height H2 of the positioning pin 50 from the top surface 44a. Thus, even when the top surface (contact portion 28b) of each of the leg portions 28L and 28R comes into contact with the top surface 44a when attaching the expansion device 12 to the portable information apparatus 14, the top of the positioning pin 50 does not come into contact with the bottom surface 18b. Consequently, the positioning pin 50 which is a metal pin can be prevented from damaging the bottom surface 18b of the portable information apparatus 14. Meanwhile, at least the contact portion 28b of each of the leg portions 28L and 28R at the surface is made of a rubber material softer than the material of the positioning pin 50, and therefore the leg portions 28L and 28R can be prevented from damaging the top surface 44a of the expansion device 12.

With the fitting of the leg portions 28L and 28R into the fitting holes 48L and 48R and the fitting of the positioning pin 50 into the positioning hole 30, the magnets 42aN to 42cN and 43aS to 43cS of the expansion device 12 attract the magnets 36aS to 36cS and 37aN to 37cN of the portable information apparatus 14. Thus, the expansion device 12 is attached to the bottom surface 18b of the portable information apparatus 14 at the predetermined position, so that the connection portion 40 is connected to the connected portion 32. This completes the attachment of the expansion device 12 to the bottom surface 18b of the portable information apparatus 14. Hence, the external apparatus connected to the connection terminals 52a to 52f can be operated and used from the portable information apparatus 14 side.

Here, the expansion device 12 is attached so that the rear surface 44c is located at a position of a certain degree of forward offset from the rear surface 18c on the rear end side of the bottom surface 18b, as illustrated in FIGS. 2B and 3. Therefore, in the electronic apparatus 10, the display chassis 20 can be smoothly opened and closed without the hinge 22 with a drop-down structure and the display chassis 20 interfering with the expansion device 12.

The front-rear dimension of the device chassis 44 of the expansion device 12 is shorter than the front-rear dimension of the apparatus chassis 18, as mentioned above. Thus, the electronic apparatus 10 secures a sufficient space S on its front side in a state in which the expansion device 12 is attached to the bottom surface 18b of the portable information apparatus 14 (see FIG. 2B). This space S may be used to further attach another expansion device 12A.

Figure 8:
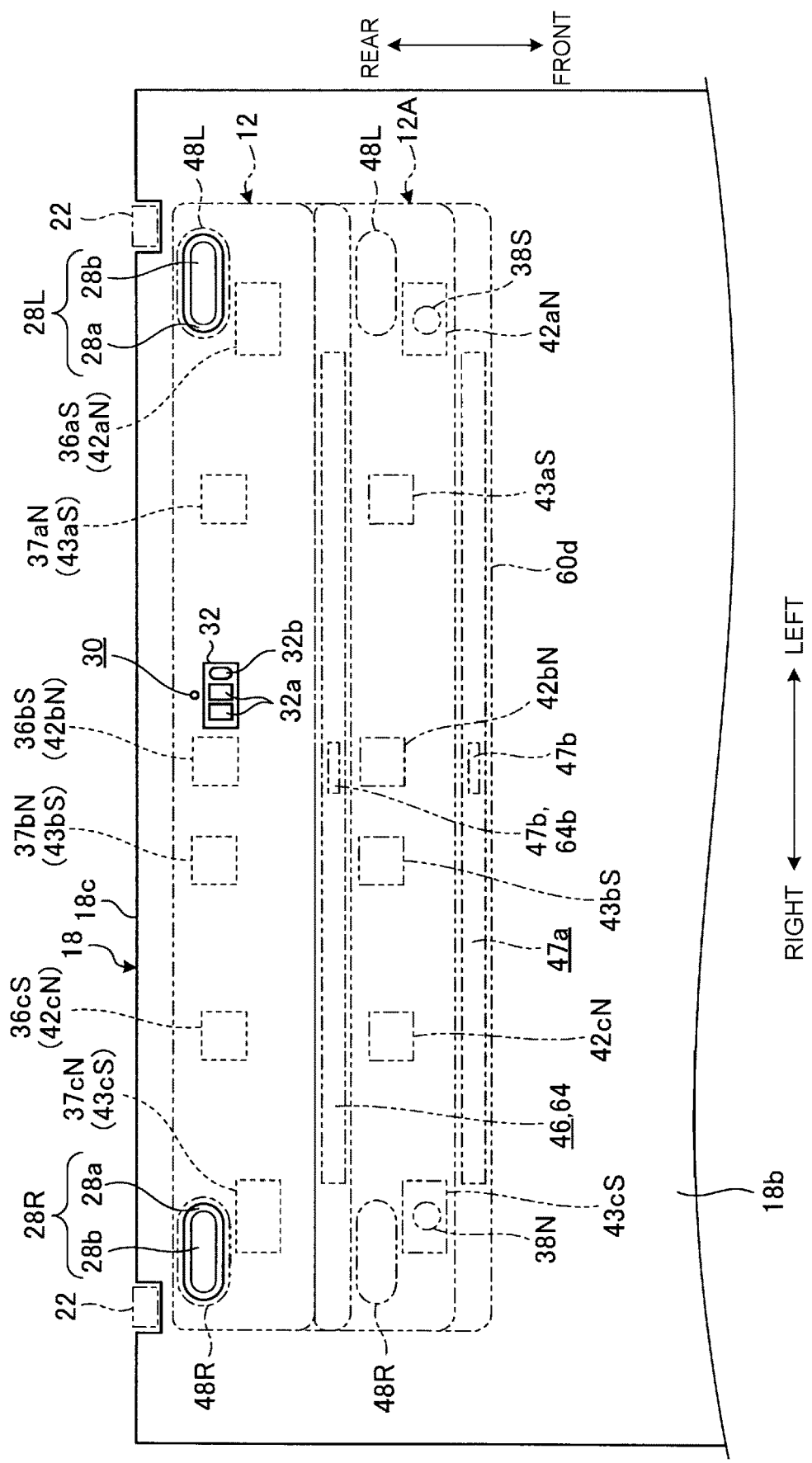
FIG. 8 is an enlarged bottom view schematically illustrating the state of the bottom surface of the portable information apparatus to which the two expansion devices are attached.
Figure 9:
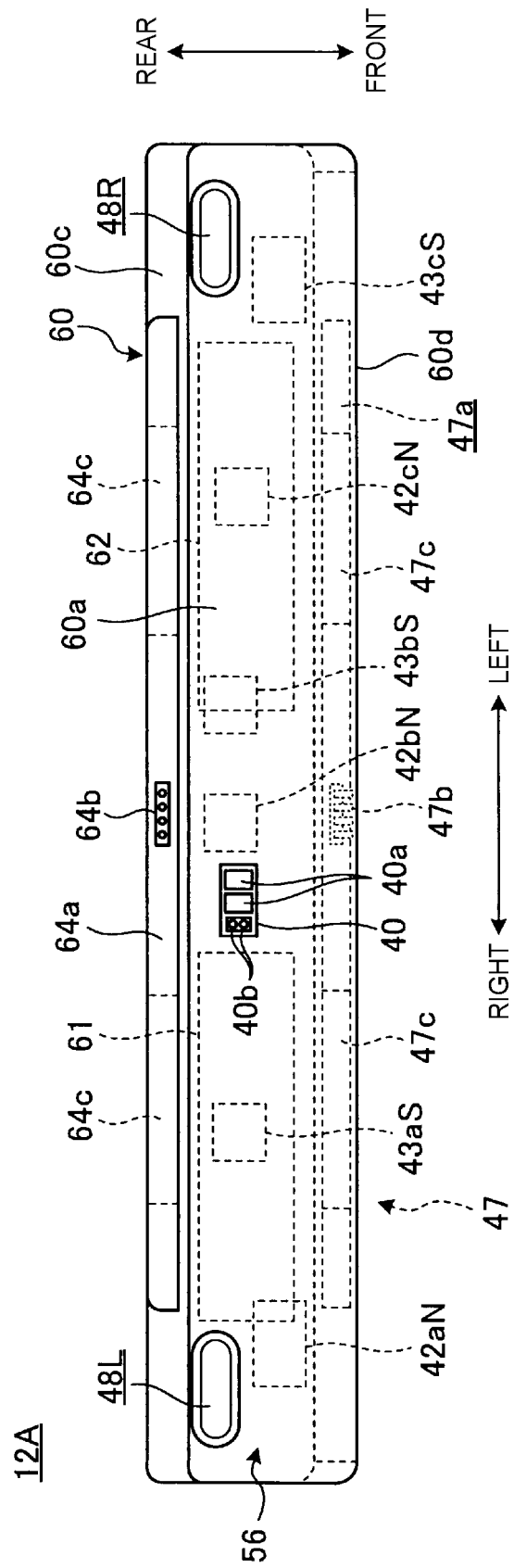
FIG. 9 is a plan view of another expansion device illustrated in FIG. 7.

FIG. 7 is a perspective view of the electronic apparatus 10 in which another expansion device 12A is added to the front surface 44d of the expansion device 12, as seen from diagonally below behind. FIG. 8 is a principal part enlarged bottom view schematically illustrating the state of the bottom surface 18b of the portable information apparatus 14 to which the two expansion devices 12 and 12A are attached. FIG. 9 is a plan view of the expansion device 12A.

As illustrated in FIG. 7, the electronic apparatus 10 according to this embodiment is also capable of simultaneously attaching the two expansion devices 12 and 12A. As illustrated in FIGS. 7 to 9, the expansion device (second expansion device) 12A includes a device chassis 60 different in shape or structure from that of the expansion device 12. For example, the expansion device 12A has a battery device 61 or a storage device 62 contained in the device chassis 60, and improves the battery function or the memory function of the portable information apparatus 14. In the case of employing specifications of not coupling the expansion device 12A to the expansion device 12, the positioning coupling portion 47 may be omitted.

The device chassis 60 is a chassis of a prismatic shape whose top-bottom thickness is thinner than that of the device chassis 44 of the expansion device 12 and whose left-right length is equal to that of the device chassis 44 of the expansion device 12. The top surface 60a of the device chassis 60 is an attachment surface to the bottom surface 18b of the portable information apparatus 14, the bottom surface 60b of the device chassis 60 is a land surface to the use surface 46 such as the top plate of a desk, and the rear surface 60c of the device chassis 60 is an attachment surface to the front surface 44d of the expansion device 12.

Figure 10A:
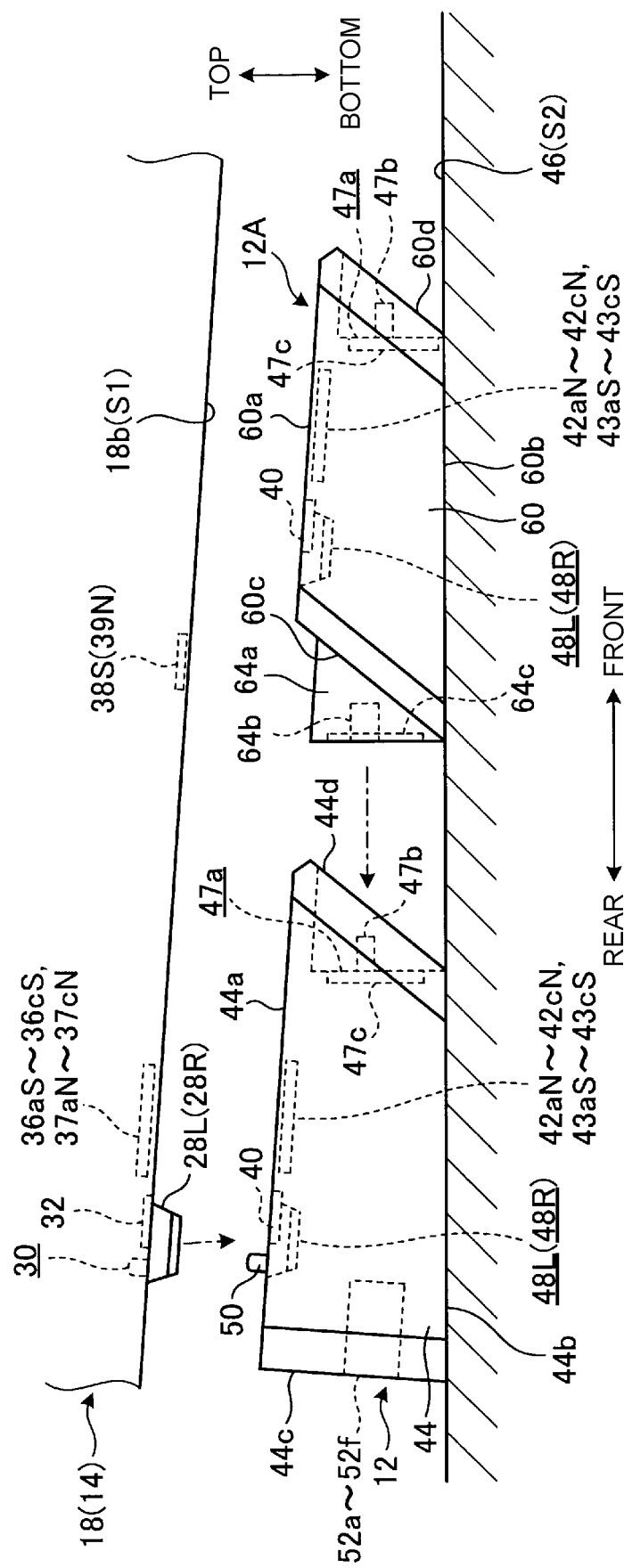
FIG. 10A is a principal part enlarged side view illustrating operation of attaching another expansion device illustrated in FIG. 7 to the expansion device and the portable information apparatus.
Figure 10B:
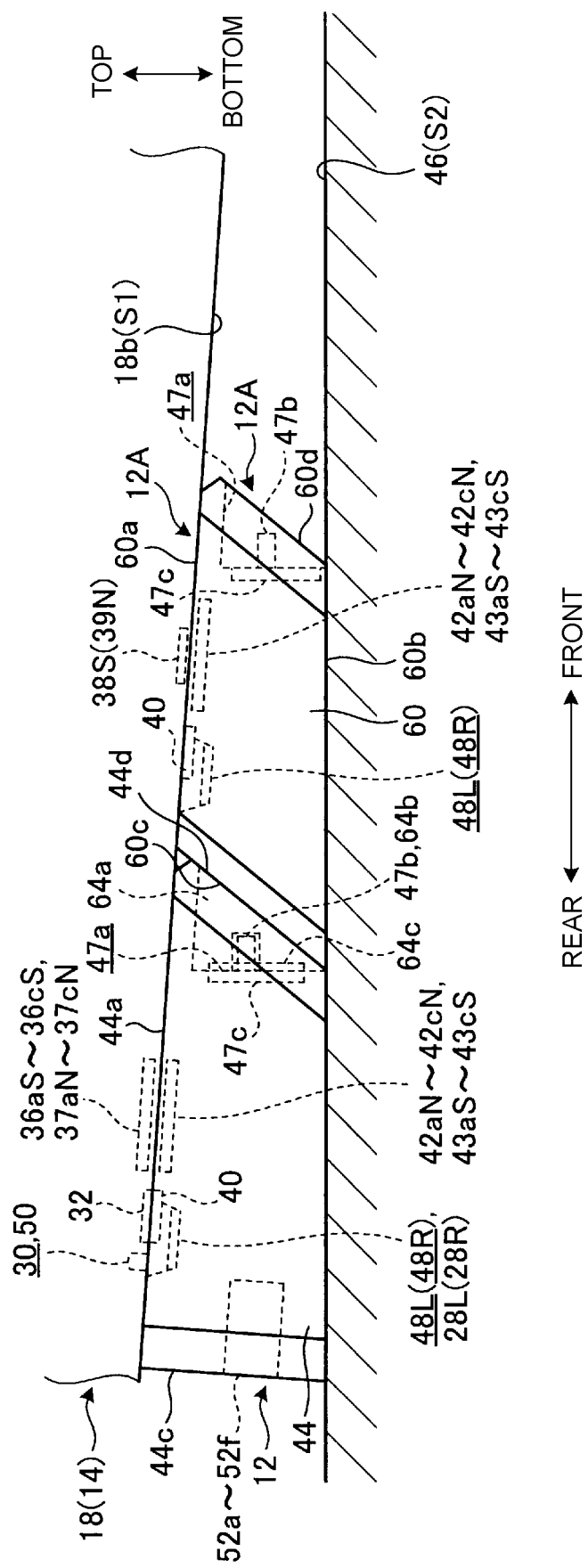
FIG. 10B is a principal part enlarged side view of the electronic apparatus in which another expansion device illustrated in FIG. 7 is attached to the expansion device and the portable information apparatus.

The device chassis 60 has a front-part-low inclined shape in which the thickness between the top surface 60a and the bottom surface 60b gradually decreases in the direction from the rear surface 60c to the front surface 60d, i.e. the direction from the rear to the front (see FIGS. 10A and 10B). In this embodiment, the bottom surface 60b is a horizontal surface orthogonal to the rear surface 60c, and the top surface 60a is a front-part-low inclined surface. The device chassis 60 has a substantially equal front-rear dimension to the front-rear dimension of the device chassis 44 of the expansion device 12, and is attached to the front surface 44d of the device chassis 44 and the bottom surface 18b of the apparatus chassis 18.

Figure 12A:
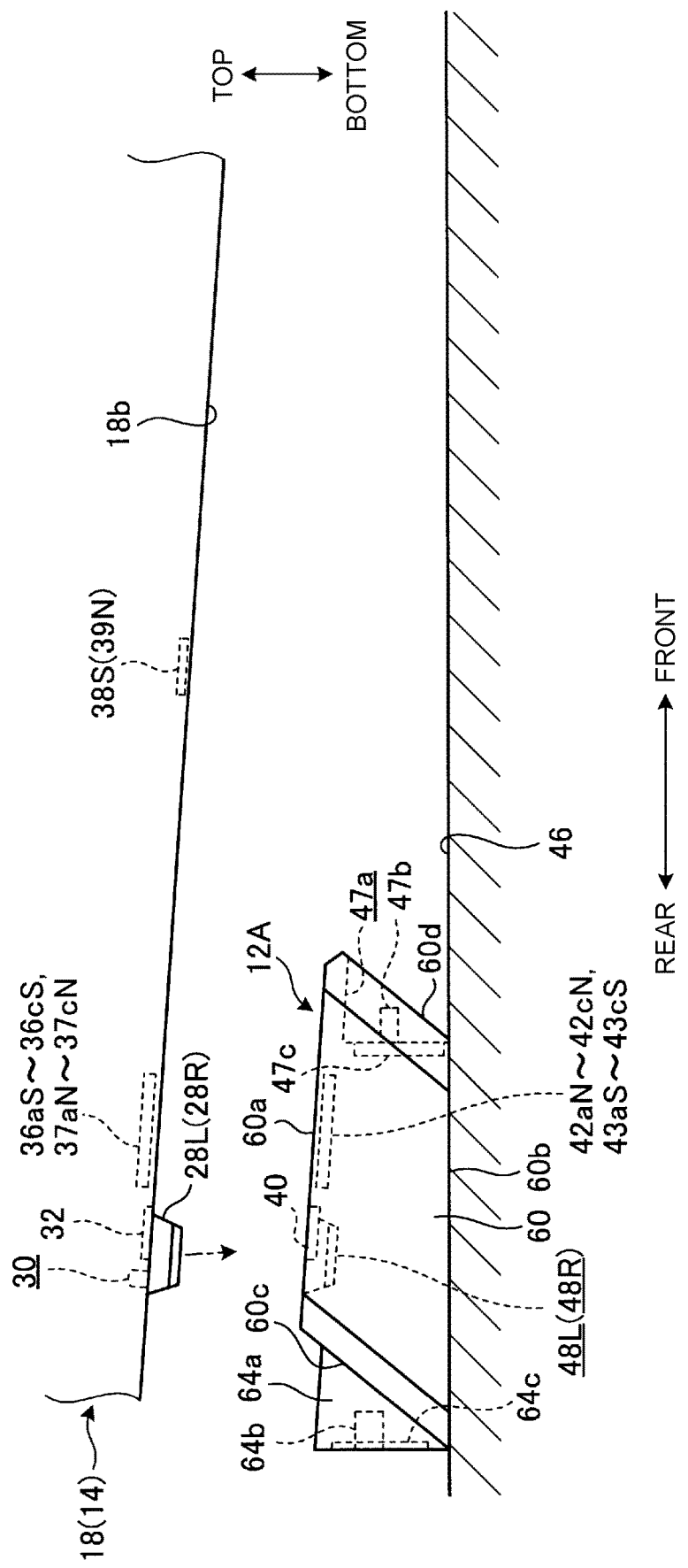
FIG. 12A is an enlarged side view illustrating operation of attaching another expansion device illustrated in FIG. 7 singly to the portable information apparatus.
Figure 12B:
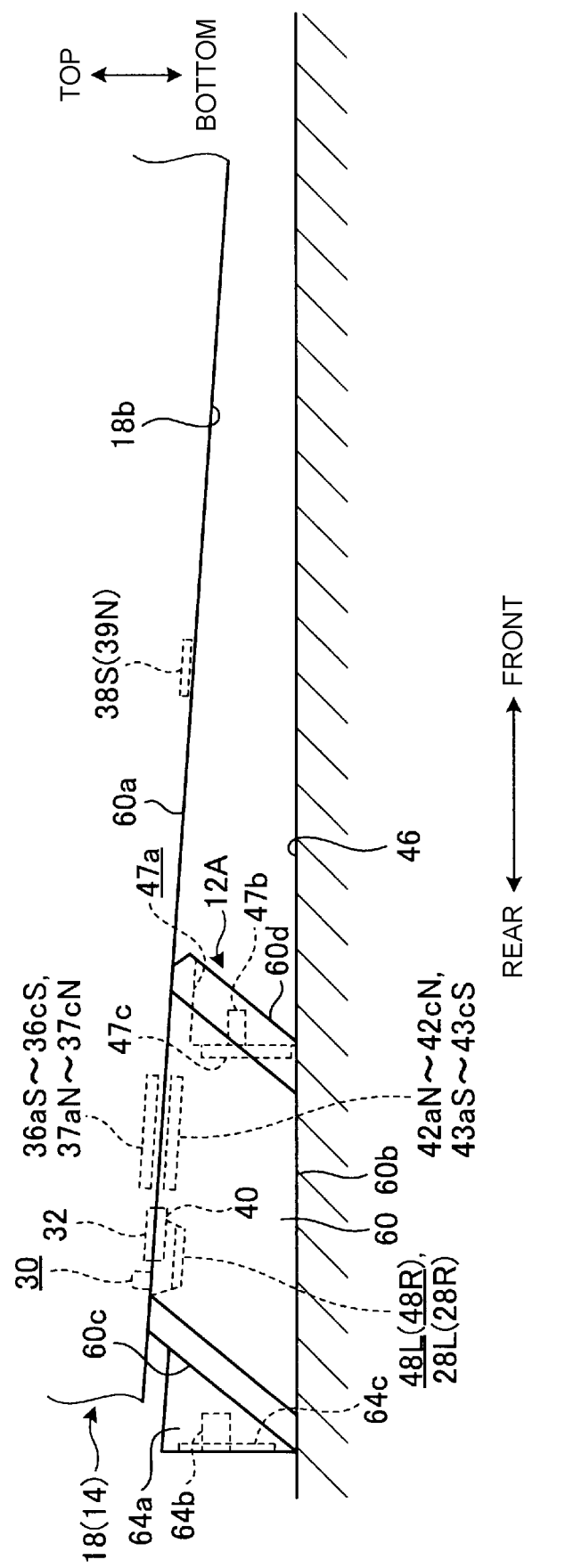
FIG. 12B is an enlarged side view of the electronic apparatus in which another expansion device illustrated in FIG. 7 is singly attached to the portable information apparatus.

As illustrated in FIG. 12B, in a state in which the expansion device 12A is attached to the bottom surface 18b of the portable information apparatus 14 together with the expansion device 12, the top surface 60a of the expansion device 12A is located on a virtual plane S1 obtained by extending the top surface 44a of the expansion device 12 forward, i.e. along the bottom surface 18b of the portable information apparatus 14, and the bottom surface 60b of the expansion device 12A is located on a virtual plane S2 obtained by extending the bottom surface 44b of the expansion device 12 forward, i.e. on the use surface 46. Therefore, even in the case where the expansion device 12A is added, the electronic apparatus 10 is provided in a front-part-low inclined posture on the use surface 46, with the bottom surfaces 44b and 60b of the expansion devices 12 and 12A landing the use surface 46 evenly and the front end of the bottom surface 18b of the apparatus chassis 18 of the portable information apparatus 14 being a land surface on the front end side (see FIG. 10B).

The rear surface 60c of the device chassis 60 is an inclined surface that is inclined gradually rearward in the direction from the top to the bottom, and the front surface 60d of the device chassis 60 is an inclined surface that is inclined gradually rearward in the direction from the top to the bottom. That is, the device chassis 60 is substantially in a shape of a parallelogram in a side view. For example, in the case where the front surface 44d of the expansion device 12 is a vertical surface, the rear surface 60c may be a vertical surface facing the front surface 44d. The front surface 60d may also be a vertical surface along the top-bottom direction. A positioning protruding portion 64a, a coupling terminal (terminal) 64b, and a magnet 64c are provided at the rear surface 60c of the expansion device 12A. The positioning protruding portion 64a can be fitted into the positioning recessed portion 47a of the expansion device 12. The coupling terminal 64b is electrically connected to the coupling terminal 47b in a state in which the positioning protruding portion 64a is fitted into the positioning recessed portion 47a. The magnet 64c attracts the magnet 47c in a state in which the positioning protruding portion 64a is fitted into the positioning recessed portion 47a. In the case where the expansion device 12A is not configured to be coupled with the expansion device 12, the positioning protruding portion 64a, the coupling terminal 64b, and the magnet 64c may be omitted.

A positioning coupling portion 47 including a positioning recessed portion 47a, a coupling terminal 47b, and a magnet 47c and used when adding yet another expansion device (not illustrated) in a removably attachable manner is provided at the front surface 60d of the expansion device 12A. The positioning coupling portion 47 may be the same as that of the front surface 44d of the expansion device 12. Such an expansion device attached to the front surface 60d of the expansion device 12A may have a chassis structure in which the top surface is located on the virtual plane S1 and the bottom surface is located on the virtual plane S2 and have a positioning protruding portion 64a, a coupling terminal 64b, and a magnet 64c at its rear surface, as with the expansion device 12A. In the case of employing specifications of not coupling such another expansion device to the expansion device 12A, the positioning coupling portion 47 may be omitted.

As illustrated in FIG. 9, in the expansion device 12A, a pair of left and right fitting holes (second fitting holes) 48L and 48R and a connection portion 40 are provided at the top surface 60a of the device chassis 60, as in the expansion device 12. Further, the device chassis 60 is provided with a plurality of magnets (second magnets) 42aN to 42cN and 43aS to 43cS so as to face the top surface 60a. The expansion device 12A does not have a positioning pin 50. A rubber plate 45 is provided at the bottom surface 60b.

The operation and structure of attaching the expansion device 12A to the expansion device 12 and the portable information apparatus 14 and removing the expansion device 12 from the expansion device 12 and the portable information apparatus 14 will be described below. FIG. 10A is a principal part enlarged side view illustrating operation of attaching the expansion device 12A to the expansion device 12 and the portable information apparatus 14. FIG. 10B is a principal part enlarged side view of the electronic apparatus 10 in which the expansion device 12A is attached to the expansion device 12 and the portable information apparatus 14.

The expansion device 12A may be attached to the portable information apparatus 14 after the expansion device 12 is attached to the portable information apparatus 14. Alternatively, the expansion device 12 and the expansion device 12A may be attached to each other beforehand, and then attached to the portable information apparatus 14 simultaneously. The operation and structure of attaching the expansion device 12 to the portable information apparatus 14 are as described above.

An example in which the expansion device 12A is attached to the expansion device 12 after the expansion device 12 is attached to the portable information apparatus 14 will be described below. First, while bringing the rear surface 60c of the expansion device 12A closer to the front surface 44d of the expansion device 12, the top surface 60a of the expansion device 12A is brought closer to the attachment position on the rear end side of the bottom surface 18b of the portable information apparatus 14 (see FIGS. 10A and 10B). The positioning protruding portion 64a of the rear surface 60c is then fitted into the positioning recessed portion 47a of the expansion device 12, and the coupling terminal 64b is connected to the coupling terminal 47b of the expansion device 12. Here, the magnets 47c and 64c attract each other.

With such attachment operation between the expansion devices 12 and 12A, the magnets 42aN and 43cS at the left and right ends of the expansion device 12A attract the magnets (second attracted bodies) 38S and 39N at the left and right of the portable information apparatus 14 (see FIGS. 8 and 10B). Thus, the expansion device 12A is attached to the bottom surface 18b of the portable information apparatus 14 in front of the expansion device 12. This completes the attachment of the expansion devices 12 and 12A to the bottom surface 18b of the portable information apparatus 14. Hence, not only the external apparatus connected to the connection terminals 52a to 52f but also the battery device 61 or the storage device 62 included in the expansion device 12A can be used from the portable information apparatus 14 side. Since the rear surface 60c of the expansion device 12A attracts the front surface 44d of the expansion device 12 using the magnet 64c and the top surface 60a of the expansion device 12A attracts the bottom surface 18b of the portable information apparatus 14 using the magnets 42aN and 43cS, a stable attachment state without wobble can be achieved. Moreover, since the expansion device 12A is attached to the front surface 44d of the expansion device 12, it does not block the connection terminals 52a to 52f provided at the rear surface 44c of the expansion device 12.

Figure 11:
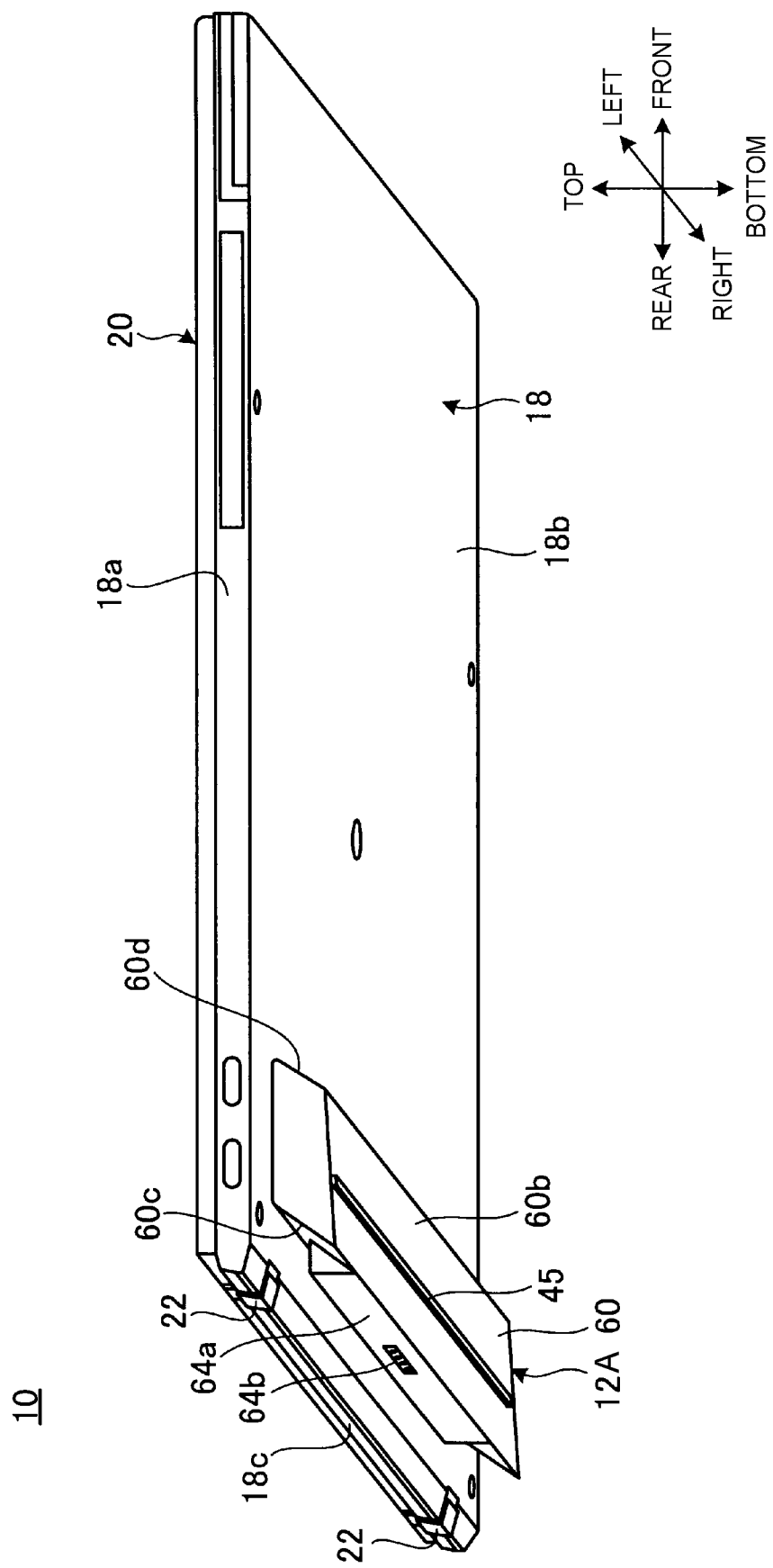
FIG. 11 is a principal part enlarged bottom view illustrating the state of the bottom surface of the portable information apparatus to which another expansion device illustrated in FIG. 7 is singly attached.

As illustrated in FIGS. 11 to 12B, the expansion device 12A may be attached to the portable information apparatus 14 singly. That is, in the expansion device 12A, fitting holes 48L and 48R and magnets 42aN to 42cN and 43aS to 43cS provided at the top surface 60a constitute a positioning attachment portion 56 that positions the expansion device 12A with respect to the bottom surface 18b of the portable information apparatus 14 and removably attaches the expansion device 12A to the bottom surface 18b of the portable information apparatus 14, substantially in the same manner as in the expansion device 12.

Therefore, when the top surface 60a of the device chassis 60 of the expansion device 12A is aligned with the rear end side of the bottom surface 18b of the portable information apparatus 14, the leg portions 28L and 28R are fitted into the fitting holes 48L and 48R of the top surface 60a. With this fitting operation, the magnets 42aN to 42cN and 43aS to 43cS of the expansion device 12A attract the magnets 36aS to 36cS and 37aN to 37cN of the portable information apparatus 14. Thus, the expansion device 12A is attached to the bottom surface 18b of the portable information apparatus 14 at the predetermined position, so that the connection portion 40 is connected to the connected portion 32. This completes the attachment of the expansion device 12A to the bottom surface 18b of the portable information apparatus 14. Hence, the battery device 61 or the storage device 62 included in the expansion device 12A can be used from the portable information apparatus 14 side.

As described above, the expansion device 12 includes: the device chassis 44 having a shorter front-rear dimension than the front-rear dimension of the apparatus chassis 18 of the portable information apparatus 14; the plurality of magnets 42aN to 42cN and 43aS to 43cS provided to face the top surface 44a of the device chassis 44 and capable of attracting the plurality of magnets 36aS to 36cS and 37aN to 37cN provided to face the bottom surface 18b of the apparatus chassis 18; and the fitting holes 48L and 48R that are provided at the top surface 44a of the device chassis 44 and into which the leg portions 28L and 28R protruding from the bottom surface 18b of the apparatus chassis 18 are fittable.

Thus, the expansion device 12 not only prevents the leg portions 28L and 28R protruding from the bottom surface 18b of the portable information apparatus 14 from interfering with the top surface 44a, but also enables effective use of the leg portions 28L and 28R for positioning. Moreover, it suffices to provide, in the apparatus chassis 18 of the portable information apparatus 14, at least the magnets 36aS to 36cS and 37aN to 37cN that attract the magnets 42aN to 42cN and 43aS to 43cS. This is easy even in the case where the apparatus chassis 18 is thin. That is, the portable information apparatus 14 does not need, at the bottom surface 18b of the apparatus chassis 18, an engagement hole for inserting a hook-like engagement member protruding from the expansion device 12. Hence, the apparatus chassis 18 of the portable information apparatus 14 can be reduced in thickness as much as possible. In addition, since the expansion device 12 does not have a hook-like member protruding from the top surface 44a, its top surface 44a is substantially flat, which contributes to high designability. The magnets 36aS to 36cS and 37aN to 37cN which are attracted bodies for the magnets 42aN to 42cN and 43aS to 43cS of the expansion device 12 may be replaced with iron plates or the like.

Moreover, fitting the leg portions 28L and 28R into the fitting holes 48L and 48R produces not only the above-described effect of positioning the expansion device 12 (12A) and effect of preventing rotation of the expansion device 12 but also the effect of preventing displacement of the expansion device 12 from a direction parallel to the bottom surface 18b of the portable information apparatus 14 and therefore the effect of preventing detachment of the magnet 42aN, etc. and the magnet 36aS, etc. In detail, since a magnet is weak against a force in a direction perpendicular to an attraction force, the attraction state between the magnet 42aN, etc. and the magnet 36aS, etc. can be maintained more reliably by preventing misalignment in a direction parallel to the bottom surface 18b of the expansion device 12 by the fitting holes 48L and 48R.

In the expansion device 12, the positioning pin 50 is nearer the connection portion 40 than the fitting holes 48L and 48R. By locating the positioning pin 50 with a considerably smaller fitting tolerance than the fitting holes 48L and 48R near the connection portion 40, positioning between the optical communication modules 32a and 40a which require highly accurate positioning can be performed by the positioning pin 50 with high accuracy.

The present invention is not limited to the foregoing embodiment, and changes can be freely made without departing from the scope of the present invention.

For example, although the leg portions 28L and 28R can be fitted into the fitting holes 48L and 48R of the expansion device 12 (12A) with a certain degree of fitting tolerance in the foregoing embodiment, one fitting hole 48L may be a long hole with a sufficiently longer left-right length than one leg portion 28L. Thus, for example, even in the case where the specifications of the portable information apparatus 14 to which the expansion device 12 is to be attached are different and the pitch between the leg portions 28L and 28R is different, positioning of the fitting holes 48L and 48R with respect to the leg portions 28L and 28R can be made reliably. This improves the versatility of the expansion device 12 (12A).

As has been described, the present invention provides an improved expansion device capable of removably attachable to thin portable information apparatuses.

While the invention has been particularly shown and described with reference to a preferred embodiment, it will be understood by those skilled in the art that various changes in form and detail may be made therein without departing from the spirit and scope of the invention.

What is claimed is:

1. An expansion device comprising:
    a device chassis having a front-rear dimension shorter than a front-rear dimension of an apparatus chassis of a portable information apparatus;
    a plurality of magnets, provided to face a top surface of said device chassis, for attracting a plurality of attracted bodies provided to face a bottom surface of said apparatus chassis; and
    a fitting hole provided at a top surface of said device chassis and into which a leg portion protruding from a bottom surface of said apparatus chassis is fittable.

2. The expansion device of claim 1, wherein at said top surface of said device chassis are provided:
    a connection portion electrically connectable to a connected portion provided at said bottom surface of said apparatus chassis in at least one of a non-contact type connection mode and a contact type connection mode; and
    a positioning projection located nearer said connection portion than said fitting hole and fittable into a positioning hole provided at said bottom surface of said apparatus chassis.

3. The expansion device of claim 2, wherein a projection height of said positioning projection from said top surface of said device chassis is lower than a projection height of said leg portion from said bottom surface of said apparatus chassis.

4. The expansion device of claim 3, wherein said leg portion has a tapered shape that gradually decreases in diameter towards a top surface thereof.

5. The expansion device of claim 4, wherein said fitting hole has a tapered shape that gradually decreases in diameter towards a bottom surface thereof.

6. The expansion device of claim 3, wherein said leg portion has, at least at a surface thereof, a softer material than said positioning projection.

7. The expansion device of claim 1, wherein said leg portion includes a pair of left and right leg portions on a rear end side of said bottom surface of said apparatus chassis.

8. The expansion device of claim 7, wherein said fitting hole includes a pair of left and right fitting holes at said top surface of said device chassis.

9. The expansion device of claim 1, wherein said device chassis has a front-part-low inclined shape in which a thickness between said top surface and a bottom surface thereof gradually decreases in a direction from a rear surface to a front surface.

10. The expansion device of claim 1, wherein a connection terminal for connecting an external apparatus is provided at a rear surface of said device chassis.

11. The expansion device of claim 1, wherein at a front surface of said device chassis are provided:
    a positioning coupling portion for positioning and removably coupling a rear surface of a second expansion device other than said expansion device; and
    a terminal connectable to a terminal provided at said rear surface of said second expansion device; and
    a plurality of second magnets are provided at a top surface of said second expansion device, said plurality of second magnets being provided to face said bottom surface of said apparatus chassis and for attracting a plurality of second attracted bodies provided on a front side of said plurality of attracted bodies.

12. The expansion device of claim 11, wherein said plurality of second magnets provided at said top surface of said second expansion device are located to allow attracting said plurality of second attracted bodies provided to face said bottom surface of said apparatus chassis.

13. The expansion device of claim 11, wherein a second fitting hole into which said leg portion of said apparatus chassis is fittable is provided at said top surface of said second expansion device.

14. The expansion device of claim 11, wherein in a state in which said second expansion device is attached to said front surface of the expansion device attached to said bottom surface of said portable information apparatus, said top surface of said second expansion device is located on a virtual plane obtained by extending a top surface of said expansion device forward, and a bottom surface of said second expansion device is located on a virtual plane obtained by extending a bottom surface of said expansion device forward.

* * * * *